June 25, 1968     J. D. MORLEY     3,389,627
TRIMMING MECHANISM FOR STRIP WELDER
Filed Aug. 31, 1966     6 Sheets-Sheet 1

INVENTOR
JOHN D. MORLEY
BY
Woodburn, Blanchard & Flynn
ATTORNEYS

June 25, 1968  J. D. MORLEY  3,389,627
TRIMMING MECHANISM FOR STRIP WELDER
Filed Aug. 31, 1966  6 Sheets-Sheet 2

INVENTOR
JOHN D. MORLEY
BY
Woodhams, Blanchard & Flynn
ATTORNEYS

June 25, 1968

J. D. MORLEY 3,389,627

TRIMMING MECHANISM FOR STRIP WELDER

Filed Aug. 31, 1966

INVENTOR
JOHN D. MORLEY
BY
Woodhams, Blanchard & Flynn
ATTORNEYS

June 25, 1968
J. D. MORLEY
3,389,627
TRIMMING MECHANISM FOR STRIP WELDER
Filed Aug. 31, 1966
6 Sheets-Sheet 4
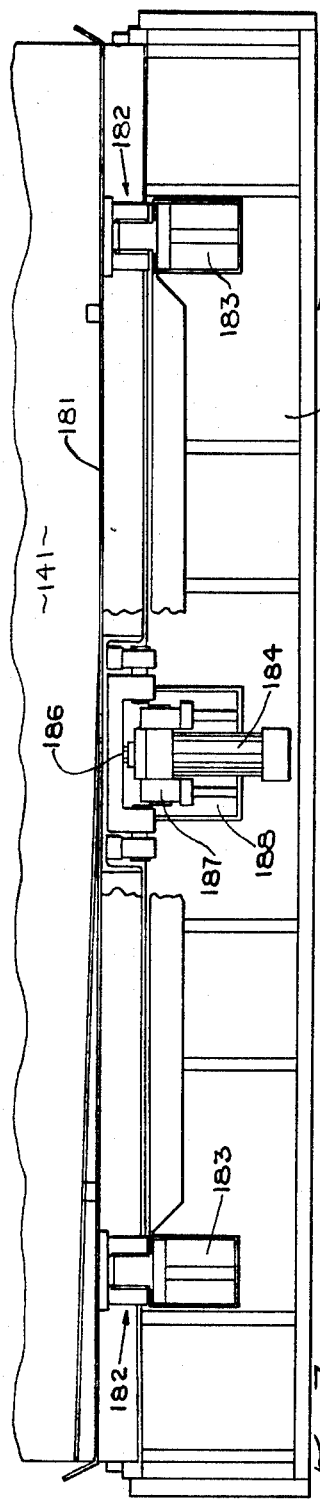
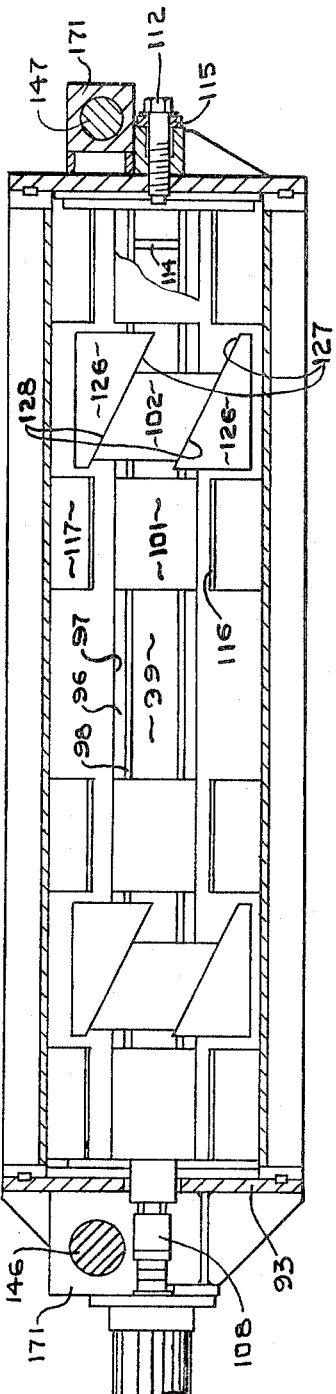
INVENTOR
JOHN D. MORLEY
BY
Woodhams, Blanchard & Flynn
ATTORNEYS

INVENTOR
JOHN D. MORLEY

INVENTOR
JOHN D. MORLEY
BY
Woodhams, Blanchard & Flynn
ATTORNEYS

United States Patent Office 3,389,627
Patented June 25, 1968

3,389,627
TRIMMING MECHANISM FOR STRIP WELDER
John D. Morley, Bay City, Mich., assignor to National Electric Welding Machines Company, Bay City, Mich., a corporation of Michigan
Filed Aug. 31, 1966, Ser. No. 576,410
15 Claims. (Cl. 83—34)

This invention relates to a strip welding machine and particularly to the portion of such machine effecting trimming of the adjacent strip ends to be welded prior to the welding thereof.

In the processing of steel strip material, such as pickling thereof, the operations are frequently continuous so it is desirable to weld successive strips together to enable the strip material to pass continuously through the processing means. As a normal step in such procedure, the adjacent ends to be welded are usually trimmed and then brought together in abutting relationship for welding. This avoids the problems of trimming experienced when such ends are overlapped for welding as dealt with in my copending application Ser. No. 553,971 but imposes the requirement that the strip ends be trimmed very exactly so that the adjacent abutting edges will be parallel to each other within a very high degree of accuracy.

Prior shearing means are of several types but all, as far as I am aware, inherently include certain disadvantages. For example, in one prior type of shear which uses the same cutting edges for cutting both strips, the cutting effect of the shearing edges is slightly different with respect to the respective sheets. This is inconsequential in relatively narrow strip, such as 18 inches in width, but when such prior shear is applied to wider strip materials, such as 80 inches in width, the resulting abutting edges are often not parallel to each other but instead sometimes form an appreciable angle.

In another prior form of shearing device, the end of one strip is cut against one edge of a square shaped shearing blade and the end of the other strip is cut against the other edge of the same blade. This provides a satisfactory trimming of the strip ends, but such ends are spaced from each other by the width of the shearing blade after trimming and must be brought substantially closer together to provide for an effective welding operation. This requires a rapid and highly accurate, though usually short, movement of at least one of the strips, (for example, the new strip) the clamps which hold it and sometimes the roll from which the new strip is fed. Even where the required movement is only of the strip and the clamps, the provision for movement of the relatively heavy clamps and the strip quickly and accurately represents added expense in provision of original equipment, added setup time and added maintenance problems.

Accordingly, the objects of the invention include:

(1) To provide trimming means for a strip welder which will cut adjacent ends of strips to be welded accurately in parallelism with each other and which will do so with said edges at an accurately predetermined spacing, including zero spacing, from each other.

(2) To provide trimming means for a strip welder, as aforesaid, wherein said strips are not moved between the trimming thereof and the subsequent welding thereof.

(3) To provide a trimming device for a strip welder, as aforesaid, in which the spacing of the trimmed adjacent edges of said strips can be adjusted easily and accurately over a relatively wide range and wherein said adjustment once made will be maintained accurately at a given value over a long period of use.

(4) To provide a trimming device for a strip welder, as aforesaid, particularly adapted to trimming very wide strips and also capable, without penalty, of precisely trimming relatively narrow strips.

(5) To provide a trimming device for a strip welder, as aforesaid, in which a linear power source is used to shift the shear portions for trimming the ends of the strips to be joined and in which shear shifting means are employed which maintain the shear blades in strict parallelism with their original positions and in predetermined alignment with each other while moving same along the strips.

(6) To provide a trimming device for a strip welder, as aforesaid, which is adaptable to workpieces of a wide variety of materials and thicknesses.

(7) To provide a trimming device for a strip welder, as aforesaid, which can be constructed for a long service life under adverse conditions with little or no maintenance and which can be manufactured for cost generally competetive with existing machines arranged for similar use.

Other objects and purposes of the invention will be apparent to persons acquainted with apparatus of this general type upon reading the following specification and inspecting the accompanying drawings.

In the drawings:

FIGURE 5 is a cross-sectional view taken on the line V—V of FIGURE 3.

FIGURE 6 is a reduced sectional view taken on the line VI—VI of FIGURE 4.

FIGURE 7 is an enlarged cross-sectional view taken on the line VII—VII of FIGURE 4.

Figure 1:
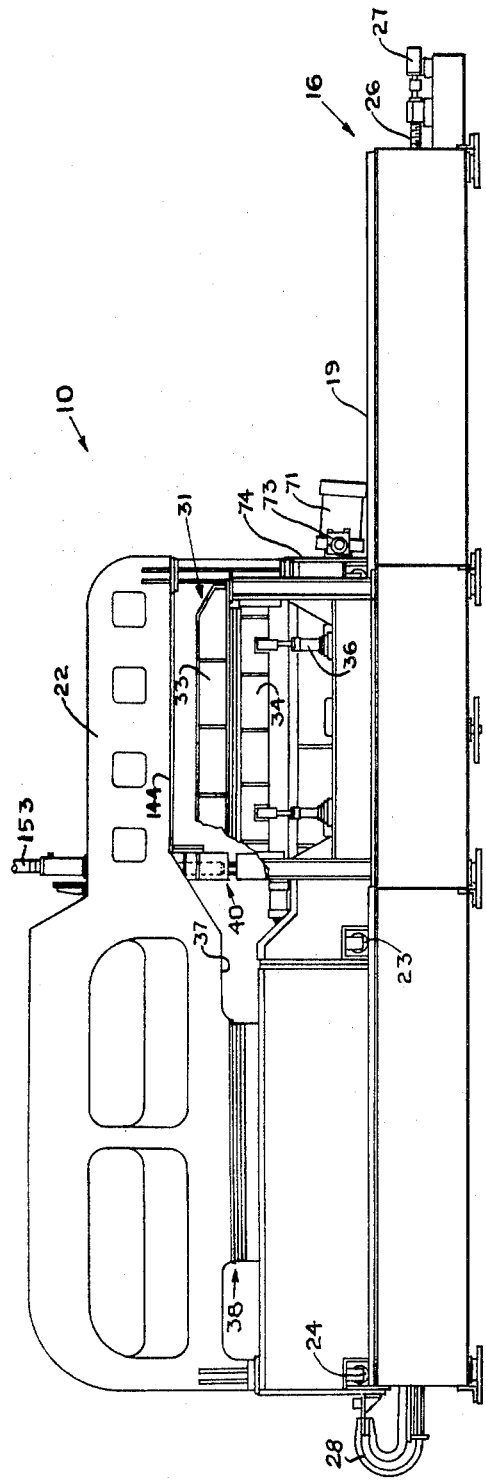
FIGURE 1 is a partially broken, side elevational view of a strip end trimming and welding machine embodying the present invention.

Certain terminology will be used in the following description for convenience in reference only and will not be limiting. The words "upwardly," "downwardly," "rightwardly" and "leftwardly' will designate directions in the drawings to which reference is made. The words "forwardly" and "rearwardly" will refer to the direction of strip flow through the machine, forwardly being the normal flow direction, such flow being from left to right in FIGURES 2, 9 and 10. The words "inwardly" and "outwardly" will refer to directions toward and away from, respectively, the geometric center of the machine and designated parts thereof. Further, the terms "tail end" or just "tail" will refer to the end of the outgoing strip, that is, the strip on the exit side of the machine. The terms "head end" or simply "head" will refer to the approaching end of the incoming strip, that is, the strip on the entry side of the machine. The terms "entry" and "exit" will be applied to portions of the machine which a forwardly traveling strip will meet first and last, respectively.

*General description*

In general, the objects and purposes of the invention are met by providing an upper and lower knife disposed on opposite sides of a first strip to be trimmed and means permitting movement of said knives longitudinally of said strip. Assuming the upper knife to be fixed and the lower one to be movable theretoward for trimming the strip, the knives are arranged with respect to each other so that the trimmed-off strip end is moved by the movable knife up past the fixed knife. Thereafter, a second strip is placed in aligned, oppositely extending and overlapped position with respect to the first and the relative positions of the upper and lower knives along the strip path is reversed for similarly trimming the adjacent end of another strip. Such reversal of the relative longitudinal positions of the knives is controlled so as to precisely place the line of cutting of the first strip with respect to that of the second strip and thereby to provide the desired spacing between the ends of the trimmed strips. Thus, the trimmed strip ends are spaced from each other as desired, including no spacing at all, without moving same or clamps holding same, at any time subsequent to the trimming thereof until the welding step is completed.

*Detailed description*

Figure 2:
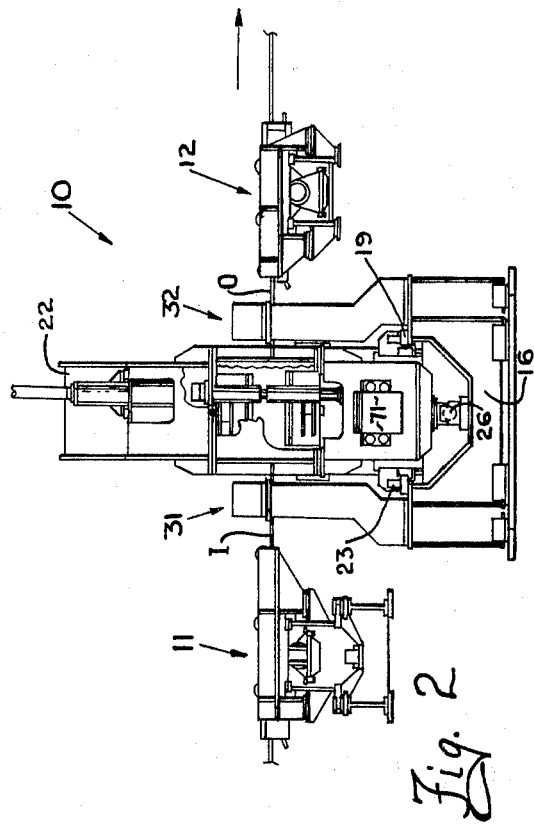
FIGURE 2 is a partially broken, right end elevational view of the machine of FIGURE 1.

Turning now to FIGURES 1 and 2, there is disclosed a strip end welding machine embodying the present invention and indicated at 10. The machine 10 as seen in FIGURE 2 includes entry and exit equipment 11 and 12, respectively, disposed on the entry and exit sides thereof and in the path of strips to be welded end to end. The entry and exit equipment supports the incoming and outgoing strips I and O to be welded respectively and maintains same properly aligned with each other and at right angles to the face of the machine 10. The entry and exit equipment may be of any convenient type and for example may be generally similar to that disclosed in copending application Ser. No. 553,970 (Attorney's reference Case 19) assigned to the assignee of the present invention.

The machine 10 itself is generally similar to the corresponding apparatus shown in copending application Ser. No. 553,971 to the extent described below. The machine 10 includes a base 16. The base is aligned with the width dimension of the strips I and O. The base is provided with a pair of tracks 19 extending the length thereof and, hence, transversely of the path of the strips. An O-frame 22 is supported on the tracks 19 by rollers, pairs of which are indicated at 23 and 24, respectively. An elongated screw 26 disposed between the tracks 19 on the base and below the O-frame 22 is rotatable by a motor 27 for causing the O-frame 22 to move along the tracks 19 to bring different portions thereof into alignment with the entry and exit equipment and, hence, with the strips I and O. A flexible member 28 is provided at the leftward (FIGURE 1) end of the machine 10 and houses suitable lines for supplying electrical and fluid power to the moving O-frame 22.

Suitable entry and exit clamps 31 and 32, respectively, are supported on the base and between the O-frame 22 and the entry and exit equipment 11 and 12, respectively. Thus, the entry and exit clamps each comprise an upper jaw 33 and a lower jaw 34, the lower jaw is here movable toward and away from the upper jaw to alternatively clamp the corresponding strip therebetween or allow passage of corresponding strip therebetween. Any convenient means may be provided for opening and closing the clamps and for providing the clamping force, here at least in part taking the form of pressure fluid cylinders 36.

The O-frame 22 has an opening 37 therethrough. The opening is widened in the direction of the tracks 19 so that the strips I and O may extend therethrough regardless of the position of the O-frame 22 along the base 16. The O-frame 22 is in the particular embodiment shown provided with suitable welding means generally indicated at 38 of any convenient type, for example, of the type disclosed in copending application Ser. No. 600,993 assigned to the assignee of the present invention. The O-frame supports at its rightward end a trimming apparatus 40 more precisely embodying the present invention, and which differs substantially from the trimming device utilized in afore-mentioned copending application Serial No. 553,-971.

Figure 3:
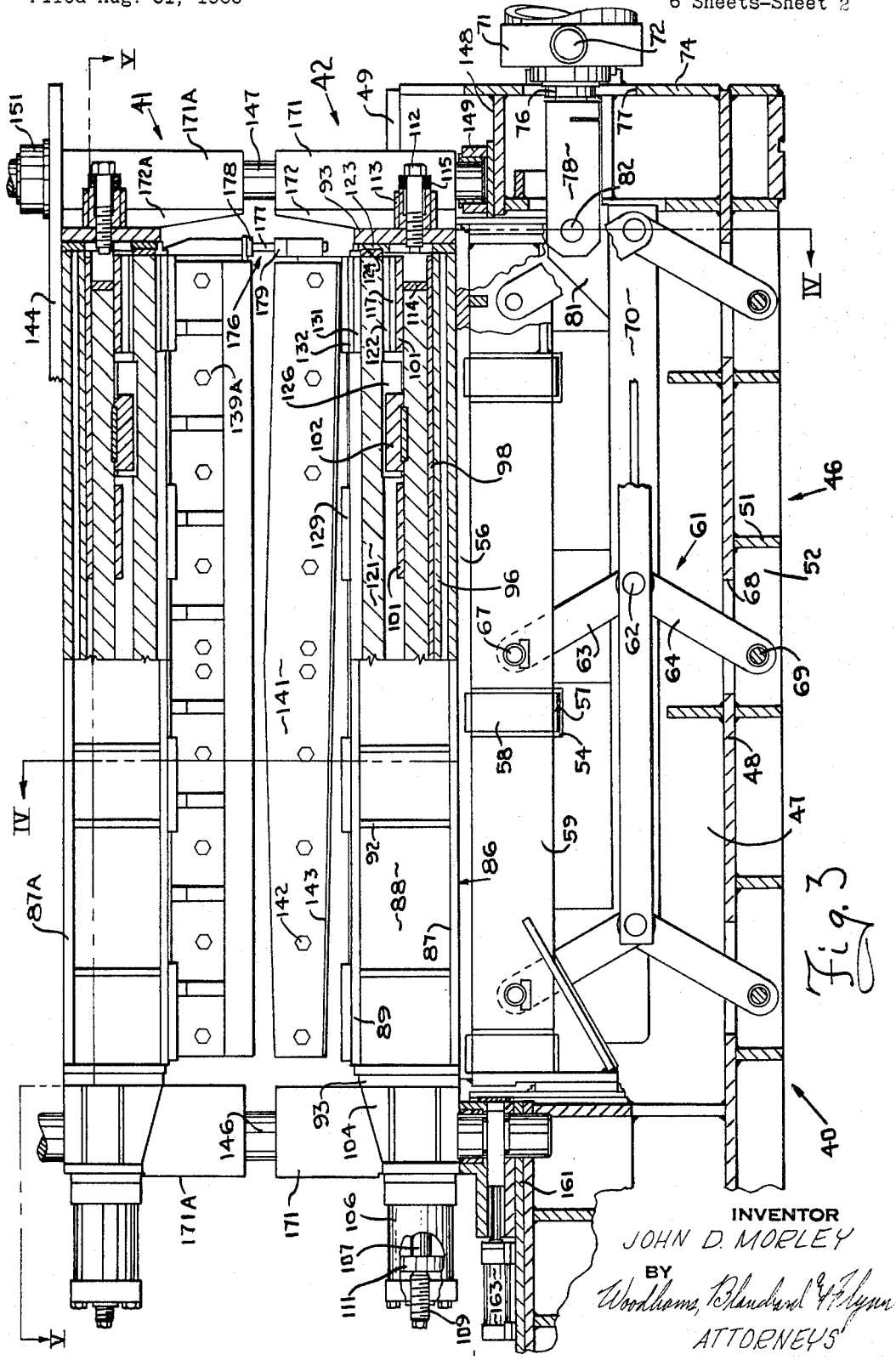
FIGURE 3 is an enlarged, fragmentary, partially broken view of the trimming apparatus of the machine of FIGURE 1 omitting the covering flaps.
Figure 4:
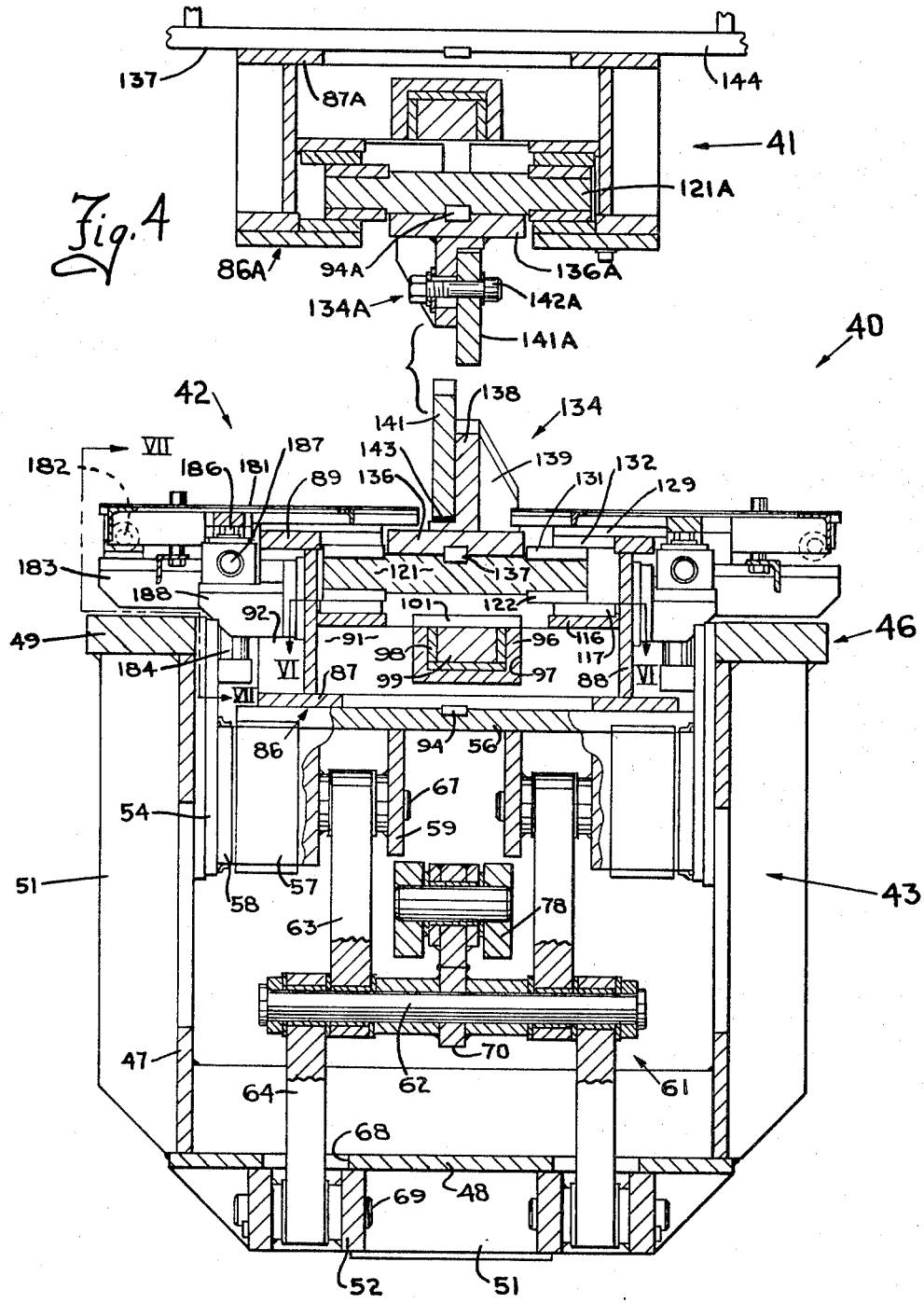
FIGURE 4 is an enlarged cross-sectional view taken on the line IV—IV of FIGURE 3.

Turning more particularly to the trimming apparatus 40 (FIGURES 3 and 4) of the present invention, same generally comprises an upper blade support unit 41, a lower blade support unit 42 and an actuating unit 43 for the lower blade support unit which is operable to raise and lower the lower blade. The portion 46 of the O-frame 22 below the opening 37, is at least in the area of the trimming apparatus 40 of generally U-shaped, upwardly opening cross section as seen in FIGURE 4. The lower portion 46 has spaced, upstanding side walls 47 and a bottom wall 48. A relatively thick rim plate 49 is fixed at its inner edge atop each of the side walls 47 and extends longitudinally thereof. Transversely and longitudinal extending buttresses 51 and 52, respectively, rigidify the frame portion 46. A plurality of vertically extended slide guides 54 are affixed to and spaced along the interior sides of the side walls 47 adjacent the top edges thereof. A horizontal mounting plate 56 is disposed in the open upper end of the lower base portion 46 and carries a plurality of depending blocks 57 along the edges thereof in transversely opposed relationship to the slide guides 54, the outer faces of the blocks 57 being provided with slide members 58 of any convenient type arranged in vertically slidable relationship with the slide guides 54. In this manner, the mounting plate 56 is mounted for vertical sliding motion with respect to the lower base portion 46 of the O-frame 22.

Transversely spaced pairs of vertical pivot plates 59 are pendently affixed to the underside of the mounting plate 56 and extend longitudinally therealong just inside the blocks 57, there being one pair of such pivot plates on each side of the mounting plate 56. The mounting plate 56 is supported by plurality, here three, of linkage systems 61 which are preferably identical. Each linkage system 61 includes a transversely extending shaft 62 to each end of which is pivotally affixed an upwardly extending link 63 and downwardly extending link 64. The upper end of each of the upwardly extending links 63 is pivotally mounted on a pin 67 carried by and extending between the opposed ones of the pivot plates 59 on each side of the mounting plate 56. The lower end of each of the downwardly extending links 64 extends through a suitable opening 68 in the bottom wall 48 and is pivotally carried by a pin 69 mounted on and extending between spaced, parallel ones of the longitudinally extending buttresses 52. A longitudinally extending bar 70 pivotally engages and extends between the shafts 62 of the several linkage systems 61 to cause same to flex in unison. In FIGURE 3, the linkages 61 are shown in their flexed condition whereby the mounting plate 56 is lowered.

As seen in FIGURES 1 and 3, a pressure fluid cylinder 71 extends rightwardly from the lower portion 46 of the O-frame 22. The pressure fluid cylinder 71 is pivotally mounted at 72 on and between a pair of mounting blocks 73 disposed on the end wall 74 of the lower portion 46. Referring to FIGURE 3, the piston rod 76 of the pressure fluid cylinder 71 extends into the lower O-frame portion 46 through suitable openings 77 and fixedly supports a yoke 78. A yoke-engaging block 81 is fixed as by welding atop the connecting bar 70 at the rightward (FIGURE 3) end thereof and has a pivot shaft 82 extending therethrough for pivotal engagement by the arms of the yoke 78. Thus, extension of the piston rod 76 of the pressure fluid cylinder 71 pushes the stub shaft 82 and, hence, the shafts 62 of each of the linkage systems 61 leftwardly as seen in FIGURE 3 causing the upper and lower links 63 and 64 of said linkage systems to move from their inclined positions shown to upstanding, longitudinally aligned positions for raising the mounting plate 56 while maintaining same horizontal. Correspondingly, retraction of the piston rod 76 drops the mounting plate 56 to its lowered position shown in FIGURES 3 and 4.

The lower supporting unit 42 is mounted on the mounting plate 56 for vertical movement therewith. The lower supporting unit 42 includes a generally rectangular housing 86 which is upwardly opening and includes a bottom wall 87 and upstanding, parallel side walls 88. Outwardly extending horizontal flange plates 89 are fixed atop the side walls 88 and extend therealong. Transverse interior bulkheads 91 and exterior, upstanding buttresses 92 rigidify the housing. The housing 86 extends substantially the length of the mounting plate 56 and is provided with end walls 93 (FIGURE 3) closing the ends thereof. The housing 86 is fixed to the mounting plate 56 by any convenient means such as screws, not shown, through the bottom wall 87 thereof and is maintained in longitudinal alignment therewith by keys 94 longitudinally aligned with said housing and disposed on opposed keyways in the bottom wall 87 and mounting plate 56.

An upwardly opening channel member 96 of rectangular cross section is preferably centered in the housing 86 and extends longitudinally thereof through suitable notches 97 in the bulkheads 91 to terminate at the end walls 93. The bottom and the side walls at the channel member 96 are preferably lined at least at the ends thereof with suitable plates 98 of suitable bearing material such as brass or the like for snugly but slideably supporting an elongated slide member 99, here of rectangular cross section. The upper face of the slide member 99 and the upper edges of the plates 98 and channel member 96 are preferably level with the upper edges of the bulkheads 91. Retainer plates 101, preferably of the same low friction material as the plates 98, are spaced along the channel member 96 and secured thereto by any convenient means such as screws, not shown.

At least and preferably a pair of parallelogram-shaped blocks 102 (FIGURE 6) are secured to the upper face of the slide member 99 at points adjacent to but somewhat spaced from the ends thereof. The parallelogram blocks 102 are arranged so that one pair of edges thereof preferably extends at right angles to the axis of the slide member 99 and the other pair of parallel edges thereof lie at acute opposite angles to the slide member. Said angled edges on one of the parallelogram blocks is parallel to the corresponding edges of the other of the parallelogram blocks. The slide member 99 extends loosely through an opening 103 in the leftward end wall 93 (FIGURE 6).

A bracket 104 extends leftwardly from the leftward end wall 93 and supports a pressure fluid cylinder 106 in coaxial alignment with the slide member 99, the piston rod 107 of the pressure fluid cylinder 106 extending rightwardly toward and being coupled to the adjacent end of the slide member 99 by a suitable coupling 108 whereby energization of the pressure fluid cylinder from any convenient source of fluid under pressure, not shown, results in corresponding axial movement of the slide member 99.

The limits of movement of the slide member 99 are precisely adjustable. More particularly, an adjustable screw 109 is threadable through the outboard head of the pressure fluid cylinder 106 for engaging the piston 111 of the pressure fluid cylinder 106. Axial adjustment of the screw 109 thus determines the leftward limit of movement of the slide member 99. Similarly, a further adjustable screw 112 is threadable through the rightward end wall 93 of the housing 86 and through a block 113 rigidly mounted on the exterior face thereof. The screw 112 is in coaxial alignment with the slide member 99 and is arranged for abutting the rightward end thereof. The rightward end of the slide member 99 is preferably supplied with a removable end piece 114 for contacting the screw 112. Thus, axial adjustment of the screw 112 allows shifting the rightward limit of movement of the member 99.

A pair of shelves 116 are provided within the housing 87, one of said shelves abutting and extending along each of the side walls 88 and being fixedly supported upon the bulkheads 91. Fixed slide blocks 117 are distributed along and fixedly mounted upon the shelves 116. A carrier plate 121 is disposed within the housing and rides upon the slide blocks 117. The carrier plate 121 extends between the end walls 93 of the housing but is spaced between the side walls 88 of the housing. The carrier plate 121 preferably includes suitable pads 122 fixed to the lower face thereof adjacent the edges thereof, such pads 122 being supported upon and slideably engaging the slide block 117 to allow movement of the carrier plate 121 at right angles to the axis of the slide member 99. One of the set of slide blocks 117 and the set of pads 122 is preferably of a suitable bushing material such as brass or the like. Further pads 123, preferably of suitable bearing material, are provided on the interior faces of the end walls 93 for contacting the ends of the carrier plate 121 to prevent lengthwise motion thereof and to guide for motion in a direction perpendicular to the axis of the slide member 99. Thus, the end pads 123 and top and bottom pads 132 and 117 act as tracks to guide the carrier plate longitudinally of the strips. If desired, suitable wear plates 124 may be provided on the end surfaces of the carrier plate 121 for contacting the pads 123. The carrier plate 121 is substantially wider than the parallelogram blocks 102 on the slide member 99.

Two opposed triangular wedge members 126 (FIGURES 3 and 5) are fixed to the underside of the carrier plate 121 on opposite sides of each of the parallelogram blocks 102. The wedge members 126 have opposed, parallel faces 127 which are angled with respect to the length dimension of the carrier plate 121 and are parallel to the opposed angled faces 128 of the adjacent parallelogram block 102, the wedge members 126 and adjacent parallelogram block 121 being in snug but slideable engagement. Thus, reciprocation of the slide member 99 causes sliding of the parallelogram blocks 102 with respect to the wedge members 126 and a consequent displacement of the wedge members and carrier plate supporting same at right angles to the movement of the slide member 99 and in parallel with the path of the strips I and O.

Each of the flanges 89 has a series of generally rectangular plates 129 affixed to and distributed along the top surface thereof by any convenient means, such as screws not shown. The plates 129 extend inwardly from the flanges 89 over the edges of the carrier plate 121. The upper surface of the carrier plate 121 is provided with a plurality of pads 131 disposed beneath and snugly but slideably engageable with corresponding pads 132 affixed beneath the overhanging portions of each of the plates 129 for firmly holding the carrier plate 121 against the slide blocks 117 for transverse sliding motion with respect thereto.

A blade support bracket 134 (FIGURES 3 and 4) is fixedly supported upon the carrier plate 121 and extends longitudinally thereof. The bracket 134 comprises a base plate 136 which is fixed atop the carrier plate 121 and is precisely transversely located thereon by a longitudinally extending key 137. The bracket 134 further includes upstanding wall 138 fixed atop the base plate 136 and braced with respect thereto by buttresses 139. An upstanding blade 141 is removably affixed to the leftward (FIGURE 4) face of the upstanding wall 138 by any convenient means such as screws 142 (FIGURE 3). Shims 143 may be provided beneath the blade 141 to properly vertically locate same. The blade 141 (FIGURE 4) is preferably rectangular in cross section so that the two upward edges thereof comprise horizontally spaced shearing edges. In addition, the upper face of the blade is referably sloped, here from center to each end as seen in FIGURE 3.

The upper blade supporting unit 41 is preferably identical to the lower supporting unit 42 except as hereinafter specifically described. Thus, parts of the upper knife supporting unit 41 similar to corresponding parts of the lower knife supporting unit 42 will be referred to by the same reference numerals thereas with the suffix A added thereto. A horizontal wall 144 bounds the upper extremity of the opening 37 adjacent the rightward end of the O-frame 22 as seen in FIGURE 1. The upper blade supporting unit 41 depends in an inverted state from the wall 144 and is centered above and extends along the lower blade supporting unit 42. The base wall 87A of the upper blade supporting unit 41 is fixed by any convenient means such as screws, not shown, snugly against the lower face of the O-frame wall 144 and, in the particular embodiment shown is precisely transversely located with respect thereto by longitudinal keys 94A. The blade 141A of the upper supporting unit 41 is here provided with horizontal cutting edges.

It will be noted that as a result of the inverted condition of the upper unit 41 with respect to the lower unit 42, that as seen from the top in FIGURES 5 and 6 the sliding faces of the blocks 102A and wedges 126A of the upper unit make angles with the slide member 99A which are opposite those made by the sliding faces of the blocks 102 and wedges 126 of the lower unit 42. This arrangement is desirable since movement of both slide members 99 and 99A in the same direction causes the blades 141 and 141A to move in opposite directions and past each other.

A pair of vertical posts 146 and 147 of circular cross section extend vertically across the rightward (FIGURES 1 and 3) portion of the O-frame opening 37 at opposite ends of the blade support units 41 and 42. More specifically, the post 147 is supported by a suitable mount 149 on a relatively narrow shelf 148 at the rightward end (FIGURE 3) of the O-frame 22. The shelf 148 is somewhat below the lowest level reached by the carrier plate 56. The column 147 extends upwardly through the O-frame wall 144 and is fixed with respect thereto by a suitable mount 151 fixed to the upper surface of said wall 144.

Figure 8:
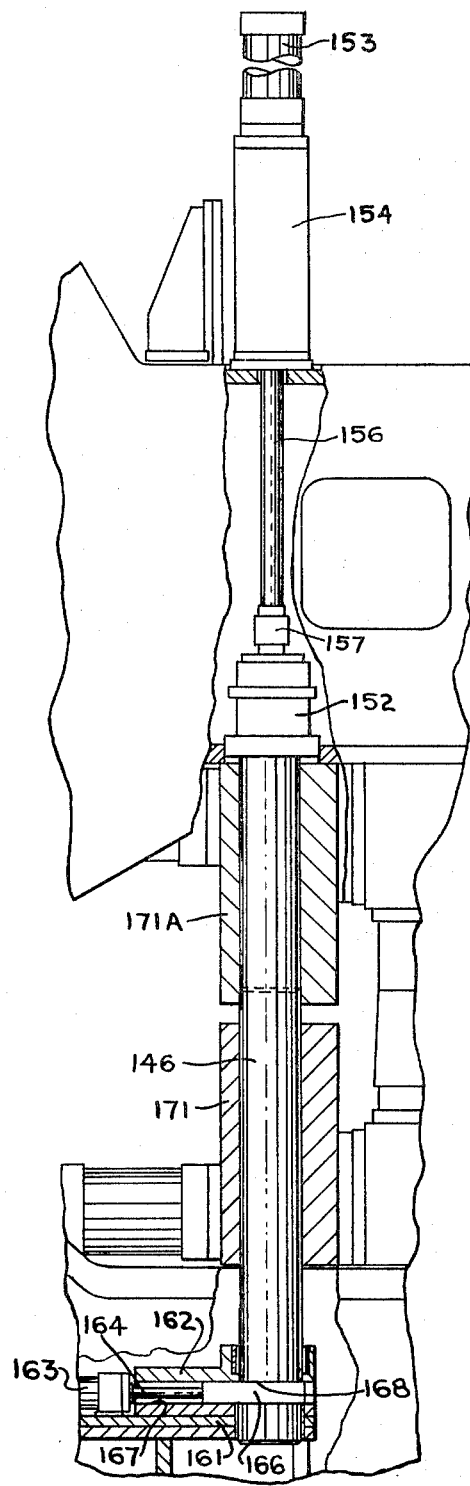
FIGURE 8 is an enlarged, partially broken fragment of FIGURE 1.

The post 146 (FIGURES 3 and 8) extends upwardly through the wall 144 and through a bushed mount 152 fixedly supported on the upper face of the wall 144. A pressure fluid cylinder 153 is coaxially located above the post 146 and is supported on the upper face of the O-frame 122 by a bracket 154. The piston rod 156 of the pressure fluid cylinder 153 extends downwardly toward and is coupled to the upper end of the post 146 by suitable coupling 157. The pressure fluid cylinder 153 has a sufficiently long stroke to raise the lower end of the post 146 upwardly at least to the bottom edge of the upper knife blade 141A as indicated in broken lines in FIGURE 8.

The lower portion 46 of the O-frame includes a further shelf 161 adjacent the leftward (FIGURE 3) end of the actuating unit 43. The post 146 when in its downwardmost position shown in solid lines, extends slideably downwardly through a suitable opening in a shelf 161 as well as through a bushed mounting member 162 fixedly mounted on the shelf 161. A horizontal pressure fluid cylinder 163 is mounted on the shelf 161. The piston rod 164 of the pressure fluid cylinder 163 extends radially toward the post 146 and carries a coaxially extending locking block 166. The locking block 166 is snugly but slideably disposed in an opening 167 in the mounting member 162 communicating with the opening therein through which the post 146 extends. The lower end of the post 146 is provided with relieved portions 168 at least at one side thereof. When the post is on its lowermost position shown, the relieved portions are aligned with the locking block 166 for receiving same so as to lock the post in its lowermost position.

Vertically elongated and aligned sleeves 171 and 171A are disposed at the ends of the housings 86 and 86A, respectively, and are rigidly secured to the end walls 93 and 93A thereof, in the case of the rightward (FIGURE 3) sleeves, by rigid bracing 172 and 172A. Corresponding sleeves 171 and 171A are coaxially aligned. The sleeves 171 and 171A extend toward each other from the housings 86 and 86A so as to have their ends closely spaced when the lower blade 141 is raised from its lowermost position shown to its uppermost position. The sleeves 171 and 171A are offset transversely from the axes of the slide members 99 and 99A, here by slightly differing amounts, here toward the exit side of the O-frame. The posts 146 and 147 are here correspondingly offset from the central sleeve of the O-frame 22 and are snugly but slideably received through the corresponding ones of the sleeves 171 and 171A. Thus, the lower knife supporting unit 42 must move precisely vertically upon energization of the actuating unit 43 and is prevented from rolling about its longitudinal axis as a result of its sliding engagement with the posts 146 and 147.

An alignment device 176 of any convenient type is preferably mounted on the lower blade support bracket 134 at the rightward (FIGURE 3) end thereof for determining whether the upper and lower blades are properly positioned for shearing. In the particular embodiment shown, the device comprises a limit switch 179 having an actuating plunger 177. The upper end of the plunger 177 is engageable with a suitable stop 178 mounted on the upper blade support bracket 134A. The limit switch 179 through any conventional circuitry, not shown, is arranged to prevent closing movement of the blades if they are not properly positioned with respect to each other.

If desired, horizontal covering flaps 181 (FIGURES 4 and 7) may be provided on the entry and exit side of the lower blade supporting unit 42 for preventing the trimmed ends of the incoming and outgoing strips from falling into the housing 86 and possibly interfering with the movable elements therewithin. In the particular embodiment shown, the covering flaps 181 extend outwardly from the blade supporting bracket 134 above the base plate 136 thereof outwardly beyond the flanges 89. The flaps 181 are pivotally supported by suitable hinge means 182 mounted on outwardly extending brackets 183 carried by the side walls 88 of the housing 86, the axes of the hinges 182 paralleling the longitudinal extent of the blade 141. The covering flaps 181 are pivotable upwardly and outwardly away from the blade support bracket 134 by pressure fluid cylinders 184. Each cylinder 184 has an upwardly extending piston rod 186 engageable with the underside of the corresponding one of the flaps 181 and is mounted on the housing 86 by pivot means 187 carried by a bracket 188. Pivotal support of the pressure fluid cylinder 184 allows rigid connection of the piston rod 186 to the flap 181 without binding during pivotal movement of the flap.

*Operation*

Although the operation of the machine embodying the invention will be to some extent apparent from the above disclosure, same will now be reviewed in detail to insure complete understanding of the invention.

Figure 9:
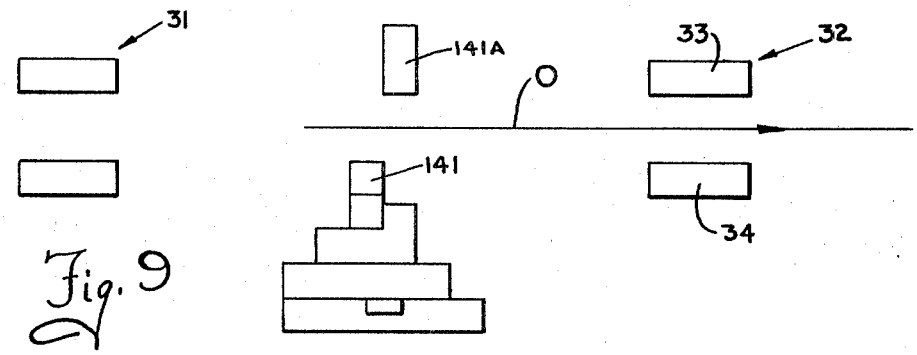
FIGURE 9 is a diagrammatic end view of the trimming apparatus embodying the invention showing the knives thereof in position for trimming the tail end of the outgoing strip.

Operation of the machine preferably begins with the upper blade 141A placed on the exit side of the lower blade 141 as indicated in FIGURES 4 and 9 and with the tail end of the outgoing strip O disposed between the blades, the lower blade 141 being in its lowered position indicated in the drawings. During closure of the exit clamp 32, here by means corresponding to the pressure fluid cylinders 36 shown with respect to the similar entry clamp 31 in FIGURE 1, the lower member 34 of the exit clamp presses the outgoing strip O tightly against the lower face of the fixed upper clamp member 33. Thereafter, the lower blade 141 is raised by the actuating unit 43 as hereinafter described which moves the exit side of the blade 141 upwardly in shearing relation along the entry side of the upper blade 141A, the waste end of the outgoing strip O thus being trimmed from the remainder of such strip.

Returning momentarily to the process of raising the lower blade 141, same is accomplished by energization of the pressure fluid cylinder 71 (FIGURE 3) for causing extension of the piston rod 76 thereof. Such extension moves the yoke 78 and therewith the center pivots 62 of the several linkage systems 61 leftwardly. Extension of the piston rod 76 stops when the links 63 and 64 of each of the linkage systems 61 are vertically aligned and the table 56 and lower blade 141 are at their maximum height. During such raising of the blade, the carrier plate 56 is maintained horizontal by the positively coupled linkage systems 61 raising same and the lower blade support bracket 134 is additionally maintained level and free from rolling by the rigidly fixed posts 71 and 72.

The waste severed from the tail of the outgoing strip L falls to the entry side flap 181 whereupon if desired, the pressure fluid cylinder 184 (FIGURE 4) may be energized to pivot the flap entry side 181 upwardly and outwardly to allow the trimmed waste portion to slide off therefrom for removal from the machine as by the machine operator. Thereafter, the flap may be returned to its horizontal position of FIGURE 4. The blade 141 is lowered after trimming to its rest position shown in the drawings by appropriate actuation of the pressure cylinder 71.

Figure 10:
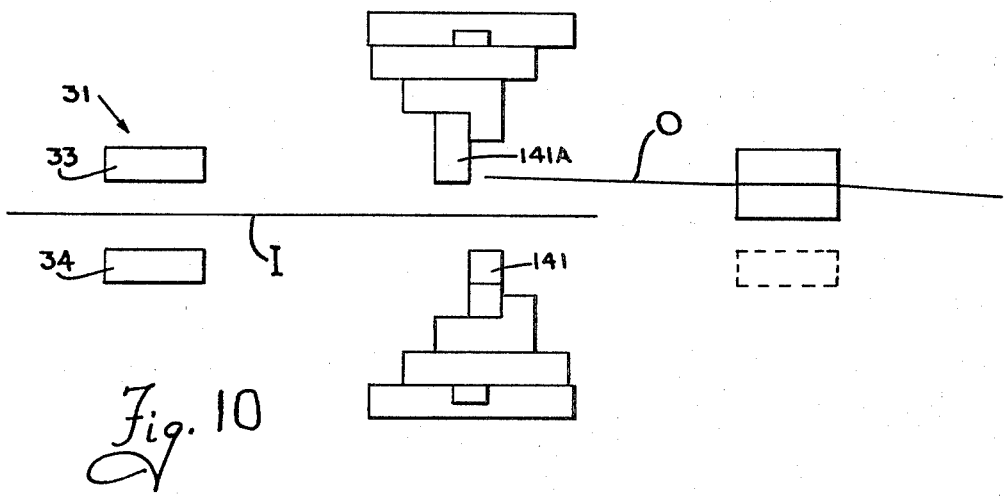
FIGURE 10 is a view similar to FIGURE 9 showing the knives shifted longitudinally of the strips to a position for trimming the head end of the incoming strip.

After the lower blade 141 is lowered out of interference with the upper blade 141A, such blades are shifted horizontally past each other to their positions of FIGURE 10. More particularly, energization of the pressure fluid cylinder 106 and 106A extends the piston rods thereof and thereby moves the corresponding slide members 99 and 99A thereof toward the right (FIGURES 3, 5, and 6) from their positions shown. The rightward limit of movement of the slide members 99 and 99A is determined by abutment thereof against the opposed ends of the adjustment screws 112 and 112A. The adjustment screw 112 is preferably provided with one or more washer-like shims 115 between the head thereof and the block 113 for determining the axial position of the tightened screw.

Since the upper knife support unit 41 is similar to the lower blade support unit 42 but is arranged upside down with respect thereto, rightward movement of the upper slide member 99A and parallelogram members 102A moves the wedge members 126A and upper blade 141A toward the incoming strip I whereas rightward movement of the lower slide member 99 and parallelogram members 102 moves the wedge members 126 and lower blade 141 in the opposite direction toward the outgoing strip O. With the blades 141 and 141A thus positioned as in FIGURE 10, the incoming strip I is led between the members 33 and 34 of the entry clamp 31 and between the blades 141 and 141A to lie under the outgoing strip O. The lower clamp member 34 is then raised to hold the incoming strip I firmly against the upper member 33. Thereafter, the lower blade 141 is raised, as described hereinabove with respect to the trimming of the outgoing strip O, so as to shear the head end of the incoming strip from the remainder thereof between the entry side of the lower blade 141 and the exit side of the upper blade 141A. Thereafter, the blade 141 is again lowered. It will be noted that the trimmed ends of both the incoming and outgoing strips are carried upwardly by the lower blade 141 past the remainder of said strips during trimming whereby the trimmed remainders are deflected very little during trimming.

With the ends of the incoming and outgoing strips so trimmed, the pressure fluid cylinders 106 and 106A may be energized in reverse to move the piston rods thereof leftwardly as seen in FIGURE 3 to retract the piston rods and to return the slide members 99 and 99A leftwardly to their positions shown in the drawings. This results in a return of the blades 141 and 141A to their position shown in FIGURES 4 and 9 in preparation for a further cycle of operation. The leftward limiting position of the slide members 99 and 99A is governed by the adjustment of the screws 109 and 109A axially aligned therewith and acting upon the corresponding pistons of cylinders 106 and 106A. As a result, the limiting positions of the blades 141 and 141A generally shown in FIGURE 4 is also determined by the screws 109 and 109A. Thus, proper adjustment of the screws 109 and 109A as well as the screws 112 and 112A will determine the clearance between the shearing faces of the blades 141 and 141A in their positions shown in FIGURES 9 and 10 and will also determine the spacing or lack thereof between the trimmed ends of the incoming and outgoing strips.

As a practical matter, after an initial setting of the screws 109 and 109A, changes in the clearance between the blades may be carried out by adjustment of the screws 112 and 112A only, which are located more conveniently to the machine operator.

More particularly, to maintain a preselected clearance between the shearing faces of the blades, each of the blades 141 and 141A must be shifted through a distance equal to the sum of its width and the clearance desired, the width of the blades 141 and 141A being in the present embodiment equal. In this way, the cutting plane or zone is located in the same position for the incoming strip as for the outgoing strip and the strips abut snugly when trimmed.

On the other hand, the same blade clearance can be maintained for trimming both incoming and outgoing strips while increasing the strip end clearance. This can be accomplished by shifting of the cutting plane or zone toward the entry side of the apparatus after trimming the outgoing strip and preparatory to trimming the incoming strip. Such a shift of the cutting plane may be carried out by transversely moving the blade 141 rightwardly a distance less, by the desired increase in strip clearance, than the sum of its width and the desired blade clearance while shifting the upper blade 141A leftwardly by a distance more, by the desired increase in strip clearance, than the sum of its width and the desired blade clearance. A decrease in the distance between the trimmed edges can readily be achieved by first moving the blade 141A rightwardly more than normal and the blade 141 leftwardly less than normal. Thus, the relative length of the strokes of the pressure fluid cylinders 106 and 106A, as determined by the distance between the inner ends of the opposed screws 109, 112 and 109A, 112A, determines the clearance between the trimmed strips. On the other hand, the relative locations of the inner ends of the set screws 109 and 109A and the relative locations of the inner ends of screws 112 and 112A determines the blade clearances.

The exit flap 181 may be actuated in a manner described above with respect to the entry flap to get rid of the trimmed incoming strip end. After the incoming strip I has been trimmed and before release of the clamps 31 and 32, the post 146 is raised above the plane of the strips to allow a rightward (FIGURE 1) shift of the O-frame 22 without interference of the post 146 with the strips 22 to be welded. The post 146 is raised by first actuating the pressure fluid cylinder 163 (FIGURE 3) to retract the locking block 166 from the relieved portion 168 in the post 146. Thereafter, the pressure fluid cylinder 153 is energized to retract the piston rod 156 which raises the post 146 upwardly out of the lower shell 171 affixed to the leftward end wall of the lower blade unit, the lower end of the post 146 coming to rest within the upper shell 171A. The O-frame 22 may then be shifted rightwardly as seen in FIGURE 1 to bring the welding apparatus 38 across the path of the strips for welding same together.

After welding, the O-frame 22 may be returned leftwardly to its rest position as shown in FIGURE 1 and the post 146 dropped into and locked in its position shown, by appropriate actuation of the cylinders 163 and 153, to terminate a cycle of the machine and to put same in condition for a further sequence of trimming and welding as above described.

Although a particular preferred embodiment of the invention has been described hereinabove for purposes of illustration, modification and variations thereof within the scope of the appended claims are fully contemplated.

The embodiments of the invention in which an exclusive property or privilege is claimed are defined as follows:

1. A method for trimming adjacent ends of successive strips to be welded, comprising the steps:

effecting a shearing operation by a pair of blades disposed on opposite sides of one of said strips, at least one of said blades being movable to effect cutting, said one blade being on the same side of the other blade as the free end of said one strip;

reversing the relative positions of said blades for cutting of the other strip, said one blade again being on the same side of said other blade as the free end of said other strip;

whereby the adjacent ends of said strips are trimmed with a high degree of precision with respect to each other.

2. The method defined in claim 1 including also the step of controlling the shifting of said blades longitudinally of said strips so that the line of cutting of each of said strips is at a predetermined desired spacing from that of the other;

whereby the welding step may then be carried out without the necessity of previously longitudinally moving either of said strips with respect to the other.

3. In an apparatus for trimming adjacent ends of metallic strips prior to the joining of the same by welding, the combination comprising:

means for supporting and guiding said strips through a trimming zone;

a first blade and first support means supporting said first blade against transverse movement with respect to the plane of said strips but permitting movement thereof in a direction longitudinally of said strips;

a second blade, second support means effecting movement of same transversely of the plane of said strips and means permitting same to move in a direction longitudinally of said strips;

means effecting longitudinal movement of each of said blades through a selected distance;

whereby said blades may be adjusted with respect to adjacent ends of said strips so that the movable blade will in each case be on the same side of the fixed blade as the free end of the strip being cut and whereby also the lines of cutting may be selected at a fixed spacing from each other.

4. The device of claim 3 in which said first and second support means respectively include first and second track means placed on opposite sides of the trimming zone and aligned parallel to and longitudinally of said strip guiding means, and including first carrier means for mounting said first blade movable on said first track, and second carrier means movable on said second track for receiving said second blade, said second support means including shear actuating means mounting said second track for effecting transverse cutting movement thereof and of said second blade.

5. The device defined in claim 4 wherein said means effecting longitudinal movement of said blades are connected to said first and second carrier means and are mounted in fixed connection with the respective track means.

6. The device defined in claim 3 in which said first and second support means each include blade shifting means arranged for movement across said strips and at an angle to the path of said blades and relatively slideable means fixed to said blades and to said shifting means for moving said blades along said strip in response to movement of said shifting means.

7. In an apparatus for trimming adjacent ends of metallic strips prior to the joining thereof by welding, the combination comprising:

a machine frame having an opening through which the strips to be welded may pass;

first and second blades extending into said opening from opposite sides thereof and toward opposite faces of said strips and arranged in offset shearing relationship, said blades extending across the path of the strip and being located on opposite sides thereof;

first and second housing means located at said opposite sides of said opening, said first housing means being fixed to said frame;

elongated first and second carrier means supporting said first and second blades, respectively, and slideably supported in said first and second housings, respectively, for reciprocation along the path of said strips;

first and second slide members reciprocably supported in said first and second housings, respectively, and extending generally along the corresponding blades;

relatively slideable means fixed to said slide members and to said carrier means, said slideable members having slideably engaged faces angled with respect to the paths of said carrier means and said slide members for producing reciprocation of said carrier means in response to reciprocation of said slide members;

table means mounted with respect to said frame for movement toward and away from said strips, said table means supporting said second housing means and means energizable for moving said table toward and away from said strips.

8. The device defined in claim 7 in which said relatively slideable means comprises:

a central member mounted on said slide member having a pair of parallel edges angled to the paths of said slide member and carrier means; and a pair of outboard members disposed on opposite sides of said central member and having edges bearing on and extending along said angled edges, said further members being fixedly mounted on said carrier means.

9. The device defined in claim 7 including adjustable stop means disposed in opposition to at least one end of the slide members for limiting the travel thereof.

10. The device defined in claim 7 in which said first and second blades each having shearing faces on opposite sides thereof so that one shearing face of said first blade coacts with one shearing face of said second blade for trimming one of the strips and, upon shifting of the blades in opposite directions along the strips, the other faces of the first and second blades coact for trimming the other strip, the length of the path of each blade being equal to at least the thickness of such blade plus the desired clearance between such blades.

11. The device defined in claim 7 including pressure fluid cylinders disposed at corresponding ends of said first and second housings and affixed thereto, said pressure fluid cylinders having piston rods engaging said first and second slide members for reciprocating same.

12. The device defined in claim 7 including posts disposed at opposite ends of said first and second housings and extending therebetween, said posts being fixed against transverse movement to said machine frame and sleeve means telescoped over said posts and rigidly affixed to said housing for preventing rocking of said housings during shearing.

13. The device defined in claim 12 wherein said machine frame is movable across said strips and including means energizable for axially retracting one of said posts from the sleeve of one of said housings and from the plane of said strips to allow the frame to move said housing means across and away from said strips without interference between said one post and said strips and further including locking means actuable to lock said one post in a position of engagement with sleeves of both said housings to prevent same from rocking.

14. The device defined in claim 7 including flap means located on either side of one of said blades between the cutting edges of said blade and the one of said housings associated therewith, said flap means being pivotally mounted with respect to said one housing and further including actuating means for pivoting said flaps with respect to said housing to move same away from said blade and to remove trimmed waste material therewith from the cutting zone.

15. The device defined in claim 7 in which said means energizable for moving said table means comprises a pressure fluid cylinder fixed on said frame and a plurality of scissors linkages each pivotally affixed at one end thereof to said table means and to said frame at the other end thereof, said linkages including pivoted central portions and means linking said central portions to the piston rod of said pressure fluid cylinder whereupon reciprocation of said piston rod causes flexing and unflexing of said scissors linkages and thereby movement of said table means toward and away from said frame.

References Cited
UNITED STATES PATENTS

| | | | |
|---|---|---|---|
| 1,494,683 | 5/1924 | Gilson | 83—561 X |
| 1,908,448 | 5/1933 | Rosener et al. | 83—34 |

WILLIAM W. DYER, Jr., *Primary Examiner.*

ANDREW R. JUHASZ, *Examiner.*

F. T. YOST, *Assistant Examiner.*